UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

AZO DYE.

SPECIFICATION forming part of Letters Patent No. 417,296, dated December 17, 1889.

Application filed September 11, 1889. Serial No. 323,608. (Specimens.)

*To all whom it may concern:*

Be it known that I, MORITZ ULRICH, doctor of philosophy, residing at Elberfeld, in the Empire of Germany, assignor to the FARBEN-FABRIKEN, VORMALS FR. BAYER & CO., at Elberfeld, have invented a new and useful Improvement in the Manufacture of Dye-Stuffs or Coloring-Matter, of which the following is a specification.

My invention relates to the production of new blue azo color for dyeing unmordanted cotton, wool, and silk by the action of ortho-tetrazo-ditolyl salts upon the dioxynaphthaline monosulpho-acid gained by melting the so-called "alpha-naphthol alpha-disulpho-acid S" described in the German patent, No. 40,571, of the Schöllkopf Aniline and Chemical Company, in Buffalo, with caustic alkali.

In carrying out my process practically I proceed as follows: Twenty kilos of ortho-tolidine are dissolved in three hundred liters water and forty (40) kilos muriatic acid of the specific gravity of 1.161. To this solution, cooled by ice, thirteen (13) kilos sodium nitrite dissolved in water are gradually added. The thus-obtained tetrazo-ditolyl chloride is then allowed to run slowly into an alkaline solution of fifty (50) kilos of the dioxynaphthaline monosulpho-acid produced by melting the so-called "alpha-naphthol alpha-disulpho-acid S" with caustic alkali. A deep-blue precipitate is immediately formed. This is filtered and dried.

My new product forms a black amorphous powder, dissolves easily in cold water with violet color, turning red by adding caustic alkali, and gives a deep greenish-blue solution with concentrated sulphuric acid. It dyes cotton not mordanted in a boiling soap bath a clear blue, not so greenish as the dye-stuff gained from the same dioxynaphthaline monosulpho-acid and tetrazo-diphenol ether. It has the following chemical formula:

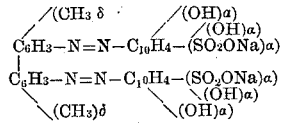

What I claim as my invention, and desire to secure by Letters Patent, is—

The coloring-matter herein described, which is produced by the action of orthotetrazo-ditolyl salts upon the dioxynaphthaline monosulpho-acid obtained by melting the so-called "alpha-naphthol alpha-disulpho-acid S" with caustic alkali, and which forms a black amorphous powder easily soluble in cold water, giving a violet solution which turns red by adding caustic alkali; in concentrated sulphuric acid it dissolves with greenish-blue color, and dyes unmordanted cotton in an alkaline bath a clear blue fast to soap and mineral acid.

In testimony whereof I have signed my name in presence of two subscribing witnesses.

MORITZ ULRICH.

Witnesses:
CARL DUISBERG,
KARL KREKELER.